United States Patent [19]
Gospodar

[11] 3,814,065
[45] June 4, 1974

[54] COMBUSTION ENGINE WITH ADDITIONAL AIR INLET VALVE
[75] Inventor: Rfinhard Gospodar, Wolfsburg, Germany
[73] Assignee: Volkswagenwerk Aktiengesellschaft, Wolfsburg, Germany
[22] Filed: Nov. 27, 1970
[21] Appl. No.: 93,134

[30] Foreign Application Priority Data
Dec. 11, 1969 Germany............................ 1962114

[52] U.S. Cl. ................................ 123/26, 123/75 B
[51] Int. Cl. ............................................ F02b 41/00
[58] Field of Search ........................... 123/26, 75 B

[56] References Cited
UNITED STATES PATENTS
2,383,565 8/1945 Rose ..................................... 123/26
3,019,777 2/1962 Candelise................................. 123/26

Primary Examiner—Wendell E. Burns
Attorney, Agent, or Firm—Ernest F. Marmorek

[57] ABSTRACT

A combustion engine comprising at least one cylinder and an associated piston defining a combustion chamber, an inlet valve for the entry of the fuel mixture into the combustion chamber, an outlet valve for the outlet of the exhaust gases from the combustion chamber, a cam arrangement for operating the inlet and outlet valves, an additional air inlet valve provided for the combustion chamber and an additional cam associated with the controlling arrangement for controlling the opening and closing of the additional air inlet valve so that a predetermined quantity of pressurized air from an associated pressurized air producer is let into the combustion chamber during a time period falling between the firing time and the end of the power stroke of the piston.

4 Claims, 2 Drawing Figures

PATENTED JUN 4 1974  3,814,065
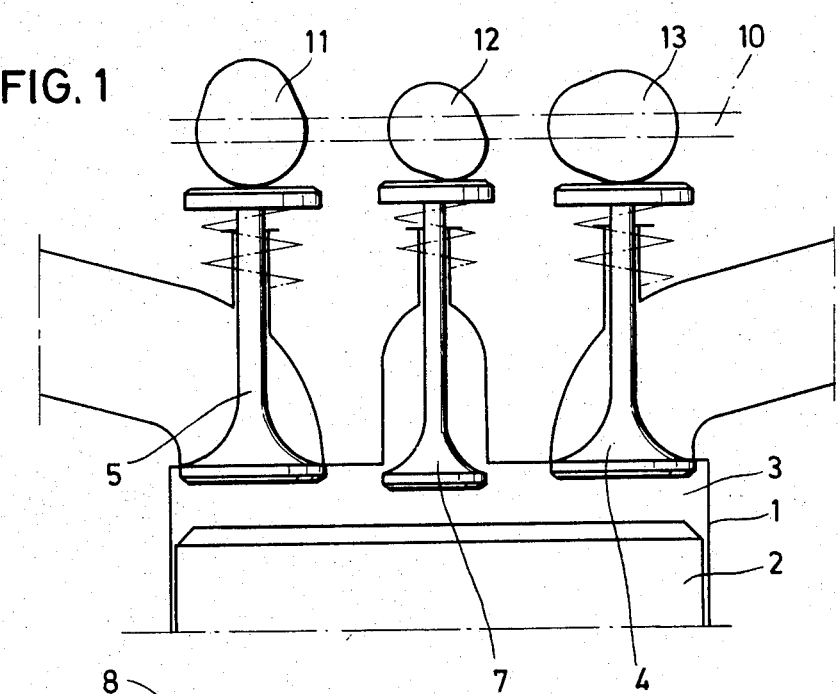
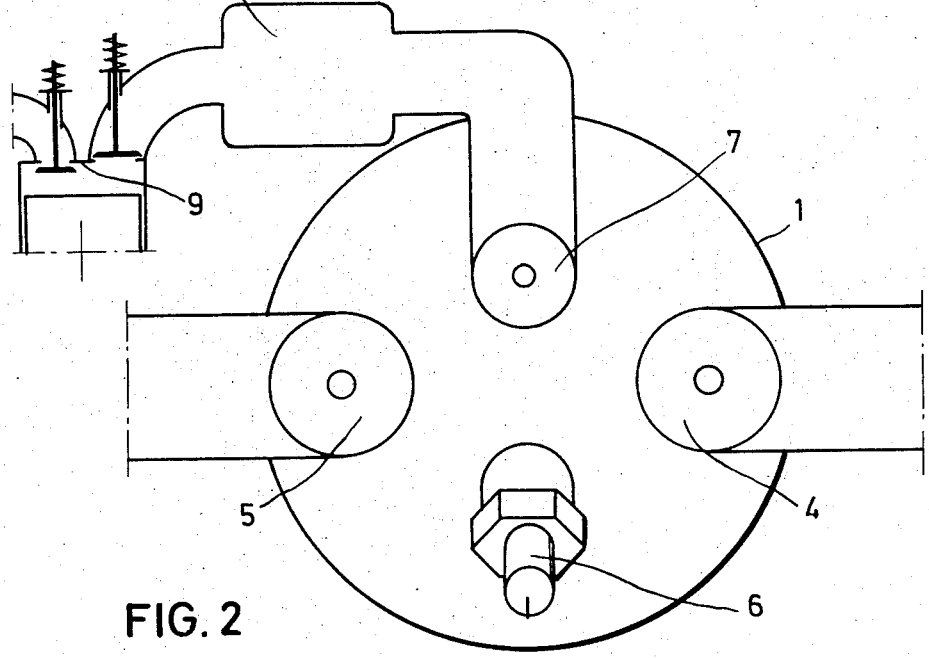
INVENTOR:
Reinhard I. Gospodar,
BY
[signature]
His Attorney.

COMBUSTION ENGINE WITH ADDITIONAL AIR INLET VALVE

FIELD OF THE INVENTION:

The present invention relates to a combustion engine which comprises at least a piston-cylinder arrangement defining a combustion chamber, an inlet valve means associated with the combustion chamber for the entry of the combustible mixture, an exhaust valve for the exhaust gases and a control arrangement for the valve means. The scope of the invention covers cylindrical, lifting or rotary piston arrangements.

SUMMARY OF THE INVENTION:

It is an object of the present invention to provide an improved combustion engine in which in order to facilitate the reduction of harmful bi-products in the exhaust gas, an additional air-inlet means is provided for improving the combustion process.

It is another object of the present invention to provide an improved combustion engine in which the above-mentioned type of additional air-inlet means is provided along with a control arrangement for such air-inlet means to govern its opening and closing and permitting the air-inlet through said additional means only at a predetermined instant of time with respect to the operation of the piston.

According to the present invention the combustion engine in addition to the additional air-inlet valve means connecting the combustion chamber with a presurized air generator (the additional air inlet means can be also in the form of a slide valve) is provided with a control arrangement which permits entry of the pressurized air into the combustion chamber through said additional air inlet means during or at least during a portion of the time period between the firing time of and the end of the power stroke; the pressurized air being admitted to the combustion chamber intermittently or continuously during such time period.

The importance of the additional air intake during the above-mentioned time period becomes especially pronounced when viewed in conjunction with the above object, that is, when an attempt is made to reduce the carbon monoxide and nitric oxide components in the exhaust gas. It is known that the nitric oxide formation is especially low when the combustion temperatures in the combustion chamber are kept low and when the air number is kept between 0.8 and 0.85. In this respect especially favorable results can be obtained with engines in which the combustion occurs relatively late and in a burst-like fashion.

All the above-noted factors which affect the extent of the nitric oxide formation become favorably limited by the present invention in that an additional air quantity is blown into the combustion chamber through an additional valve at a time instant falling in the neighborhood of the firing point; also, in some cases, shortly ahead of such time instant (in order to compensate for the time needed for the mixing process) or only during the power stroke. As a result, the combustion temperature becomes lower and the combustion of those fuel components becomes possible for which there was no oxygen provision in the original fuel-air mixture and, by an appropriate selection of the time period of the opening of such additional air-inlet valve means as well as by the selection of the quantity of the additional air intake, the combustion process becomes influenced in a favorable manner.

In addition to the selection of the time instant of the air entry and of the quantity of the air to be additionally blown into the combustion chamber, the appropriate selection of the direction of the air blow can also have importance in attaining the above-mentioned favorable effects.

It might be of interest to select the blow direction of the additional air in such a manner that a good mixture with the fuel air mixture already present in the cylinder is prevented and, instead, a layer-like charge is obtained. For example, in accordance with the present invention this can be attained by ensuring that the mixture in the neighborhood of the spark plug is richer than in the regions of the combustion chamber which are remote from the spark plug.

The invention can be advantageously used also to solve other problems such as associated with an increase of the engine performance in order to meet an increasing load capacity.

Furthermore the invention provides also for an improvement in the sealing since the rich mixture near the plug is knock-free.

BRIEF DESCRIPTION OF THE DRAWINGS:

The invention will become more readily apparent from the following description of a preferred embodiment thereof shown by way of example in the accompanying drawing, in which:

FIG. 1 illustrates an embodiment of the invention illustratively showing an engine with a lifting piston in a vertical sectional view and particularly showing only a single cylinder having a single piston; and FIG. 2 shows the single cylinder arrangement of FIG. 1 in a top view.

DESCRIPTION OF THE PREFERRED EMBODIMENT:

With reference to FIGS. 1 and 2 it is seen that cylinder 1 forms with the illustratively shown lifting piston 2 guided therein a combustion chamber 3 which is provided with an inlet valve means 4 for the entry of the combustible mixture and with an outlet valve means 5 for the exhaust. These valves 4 and 5 are arranged in the cylinder cover which, as seen in FIG. 2, carries also the spark plug 6.

In accordance with the present invention an additional air-inlet valve means 7 is provided also for the combustion chamber 3 which, just as well as valves 4 and 5, can have a known structural design and for this reason, their structural details are not shown separately.

In practicing the present invention one should consider that the pressure with which the air is blown through the additional air-inlet valve means 7 into the combustion chamber 3 should be higher than the pressure in the combustion chamber 3 itself. In the preferred embodiment of the present invention the pressurized air flows into the combustion chamber 3 with a pressure which is higher than the combustion pressure occurring at the instant of the entry of the additional air quantity. It can, in this respect, involves even the highest combustion pressure. The present invention provides that the additional air-inlet means 7 preferably is not directly connected with the pressurized air producing means, but there is provided between them a pressurized air container in which, for example, a pressure of about 55–65 atmospheric excess pressure is present. The volume of the additional air intake can be controlled by providing that a predetermined volume of the pressurized air container is discharged only into the combustion chamber 3 and the connection thereof with the compressor or with the storage container during the air blowing time is interrupted.

In the embodiment shown in the drawing, the additional air-inlet valve means 7 is in direct connection with a pressurized air container 8 which serves also as a storage device for the air delivered by a compressor 9 and is under a pressure, for example, of about 55–65 atmospheric excess pressure.

The additional air-inlet valve means 7 is operated in such a manner that it is opened only during a time period falling between the firing time and the end of the power stroke of the engine and, during this time period, it lets the air into the combustion chamber 3.

According to the present invention the control of the inlet, outlet and additional air-inlet valve means is performed in a combined fashion so that each of the above-mentioned valve means are operated by an individual camming means provided on a common shaft. Of course, provision should be made that the operation of the additional air-inlet means is in strict synchronism with the operation of the engine itself. More particularly, an appropriate control arrangement according to the present invention is shown in the exemplary embodiment according to which the control of the valves 4, 5 and 7 is performed by a common control arrangement. This control arrangement comprises as essential components a common cam shaft 10, as well as cam discs 11, 12 and 13 associated with each of the above-mentioned valves 4, 5 and 7, respectively, so that an individual control of the valves is possible in strict synchronism with the operation of the engine.

From the above, it is apparent that although the invention has been described hereinbefore with respect to a certain specific embodiment thereof, it is evident that many modifications and changes may be made without departing from the spirit of the invention. Accordingly, by the appended claims, we intend to cover all such modifications and changes as fall within the true spirit and scope of this invention.

I claim:

1. A combustion engine comprising at least one cylinder and an associated piston means defining a combustion chamber, inlet valve means for the entry of the fuel-air mixture into said combustion chamber at an air number between 0.8 and 0.85, outlet valve means for the outlet of the exhaust gases from said combustion chamber, a control arrangement for operating said inlet and outlet valve means, the improvement consisting of an additional air-inlet valve means provided for said combustion chamber and means associated with said controlling arrangement for controlling the opening and closing of said additional air-inlet means so that a quantity of pressurized air from an associated pressurized air means is let into said combustion chamber during a time period in the neighborhood of the firing time with a pressure higher than the combustion pressure occurring at the instant of adding the pressurized air.

2. The combustion engine as claimed in claim 1, wherein said control arrangement comprises a common shaft means and a plurality of camming means provided thereon and associated with each of said valve means for affecting opening and closing of said valve means at predetermined time instants.

3. The combustion engine as claimed in claim 1, wherein said additional air-inlet means is connected with a pressurized air container.

4. The combustion engine as claimed in claim 1, wherein said additional air is blown into said combustion chamber continuously during said time period.

* * * * *